Nov. 8, 1960  J. L. LUTTRELL ET AL  2,959,049
SHOCK TESTER
Filed April 22, 1959  3 Sheets-Sheet 2

INVENTORS,
JOHN L. LUTTRELL
VALMORE F. DE VOST
GEORGE STATHOPOULOS
JOHN E. MESSNER

BY
ATTORNEYS.

Nov. 8, 1960   J. L. LUTTRELL ET AL   2,959,049
SHOCK TESTER
Filed April 22, 1959   3 Sheets-Sheet 3

INVENTORS.
JOHN L. LUTTRELL
VALMORE F. DE VOST
GEORGE STATHOPOULOS
JOHN E. MESSNER
BY
ATTORNEYS.

United States Patent Office 2,959,049
Patented Nov. 8, 1960

2,959,049
SHOCK TESTER

John L. Luttrell and Valmore F. De Vost, Silver Spring, George Stathopoulos, Hyattsville, and John E. Messner, Ellicott City, Md., assignors to the United States of America as represented by the Secretary of the Navy Filed Apr. 22, 1959, Ser. No. 808,286

10 Claims. (Cl. 73—12)

(Granted under Title 35, U.S. Code (1952), sec. 266)

The invention described herein may be manufactured and used by or for the Government of the United States of America for governmental purposes without the payment of any royalties thereon or therefor.

This invention relates to testing devices and more particularly to a shock tester for testing and evaluating gravity-sensitive inertia-operated devices by applying a shock thereto at any desired angle while the devices are mounted in their normal orientation with respect to the earth's gravitational field.

In devices of this character heretofore devised such, for example, as the device usually known as a drop tester, it has been the usual practice to apply the impact force to the device in a vertical direction and, if necessary, tilting the device under test at an angle from its normal orientation with respect to the earth's gravitational field to simulate the conditions of service in cases where the impact applied to the device while the device is in the normal oriented position with respect to the earth's gravitational field is applied at other than a direction lying in a horizontal plane. The tilting of such devices from an initial vertical oriented position when the devices are tested with the prior art devices introduces an error in the test results due to the effect of gravity on the device when the device is disposed in a position other than the initial oriented position with respect to the earth's gravitational field. This error factor assumes serious proportions when the inertia responsive element is sensitive to small changes in the rate of travel of the device under the conditions of service, small variations in the acceleration thereof and a small impact applied thereto such as may result, for example, when the device is employed as an inertial operated switch in the exploder mechanism of a moving torpedo in service.

The device of the present invention possesses all of the advantages of the prior art devices and none of the foregoing disadvantages. In accordance with the present invention, the device is maintained in an initial oriented position with respect to the earth's gravitational field during the testing operation and a sudden impact is applied thereto at a predetermined selected angle with respect to the direction of the gravitational field.

One of the objects is to provide a new and improved shock tester having means for applying a shock impulse to the object under test at any angle while the object is in an initial predetermined oriented position.

Another of the objects is the provision of a shock testing device having means for applying a shock in any direction to an object while the object is suspended from a test vehicle.

Still another object is the provision of a shock testing device for applying a shock impulse in any direction to an object under test including means for varying at will the character and strength of the impulse applied thereto.

A still further object is the provision of a new and improved testing device for a gravitationally sensitive object operable by inertia in response to a force suddenly applied thereto in which means are provided for applying the force in any direction to the object while the object is in a predetermined oriented position with respect to the earth's gravitational field which includes means for measuring the force of the impact applied to the object and the response of the object thereto.

Still other objects, advantages and improvements will become apparent from the following description taken in connection with the accompanying drawings in which.

Figure 1:
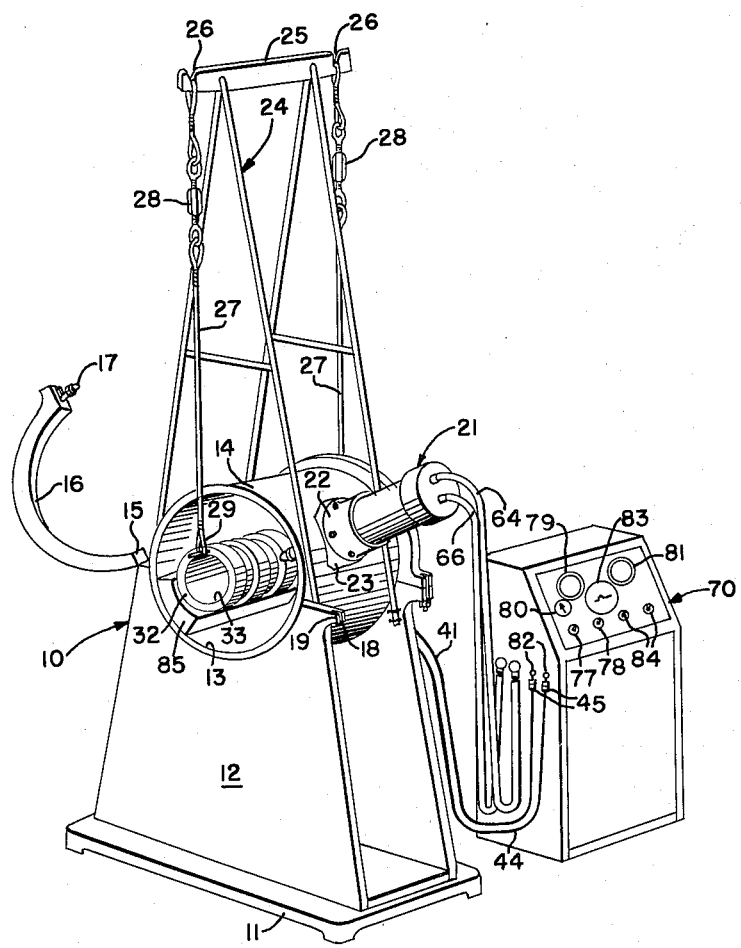
Fig. 1 is a view in perspective of the device of the present invention according to a preferred embodiment thereof.

Referring now to the drawings on which like numerals of reference are employed to designate like or similar parts throughout the several views and more particularly to Fig. 1 thereof there is shown thereon a shock tester of the present invention indicated generally by the numeral 10 and comprising a base 11 to which are affixed in any suitable manner a pair of upright supports 12 having a semi-circular saddle 13 formed therein adapted to receive and support a cylinder 14. Hinged to each of the supports 12 as at 15 is a semi-circular clamping member 16 provided at the other movable end thereof with a toggle bolt 17 adapted to engage a slot 18 in a projection 19 of the support 12 and clamp the cylinder 14 in any desired setting thereof as the bolt is tightened.

An air gun generally designated by the numeral 21 is supported by flange 22 thereof to a boss 23 secured to the outer surface of cylinder 14 in such manner that the gun projects inwardly through the cylinder in a radial direction substantially as shown. The description of the air gun and the method of use will become more clearly apparent by reference to Fig. 3 as the description proceeds. Secured to the upright support 12 in any suitable manner is a framework generally indicated by the numeral 24 to which is affixed at the upper portion thereof a cross bar 25 having a pair of notches 26 formed in the end portions thereof to receive and support a pair of elastic cords 27, a turnbuckle 28 being provided preferably between each of the cords and the cross bar to adjust the effective length of the elastic cord secured thereto.

Each of the elastic cords 27 is provided with a looped portion 29 formed in the lower end thereof for engagement with a pair of pin members 31 secured at opposite ends of a heavy tubular member 32 comprising the seismic test vehicle of the present invention. The tubular member 32 is provided with an annular bore 33 of uniform cylindrical configuration and a plurality of enlarged collars 34 formed exteriorly therewith to increase the rigidity of the test vehicle and the adaptability thereof for the purpose intended.

Figure 2:
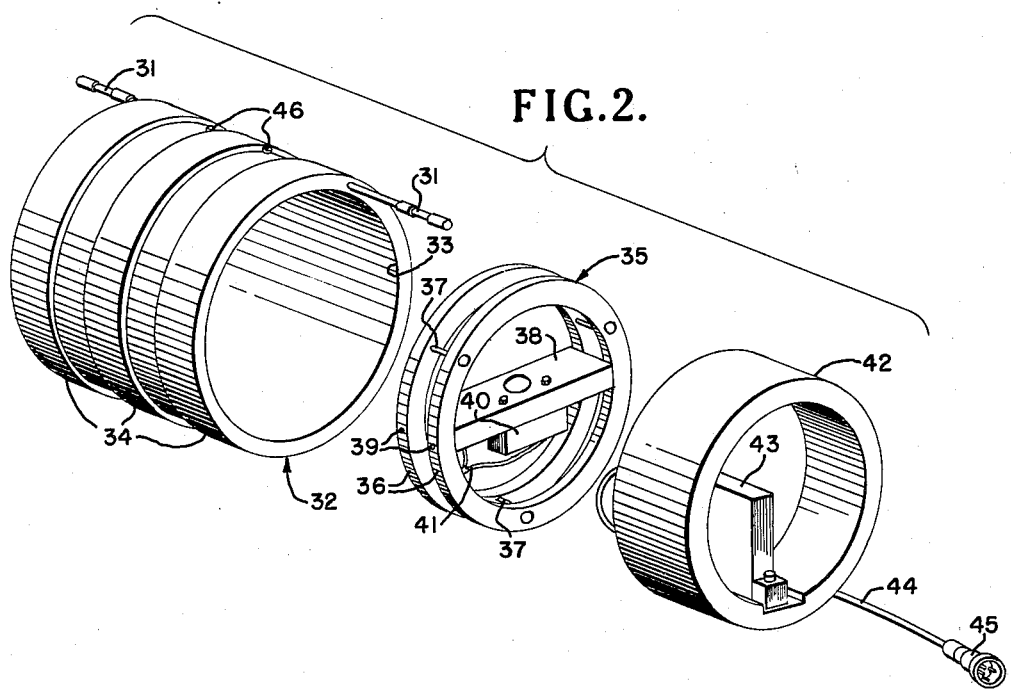
Fig. 2 is an exploded view in perspective of the test vehicle, the rotatable test specimen mount and the rotatable accelerometer mount, each of the mounts being removed from the test vehicle within which they are normally carried.

Fitted within the test vehicle or tubular member 32 is a rotatable test specimen mount 35, Fig. 2, preferably comprising a pair of annular members 36 secured together in any suitable manner as by the studs 37 illustrated and configured externally for slidable and rotative movement within the test vehicle 32. Diametrically disposed within the annular member 36 is a platform 38 secured thereto in any suitable manner as by the screws 39 on which is mounted a test specimen such, for example, as the inertia switch 41 illustrated.

There is also provided an annular mount 42 having secured therein an accelerometer 43 in such manner that the force of acceleration sensed thereby is in a radial plane with respect to the accelerometer mount. The accelerometer is connected by a cable 44 having an electrical coupling 45 at the outer end thereof for establishing an external electrical circuit to the accelerometer.

The rotatable test specimen mount and the accelerometer mount are secured in preselected positions within the tubular member 32 by the mount locking screws 46 illustrated in such manner that when the test vehicle is suspended by the pin members 31 the platform 38 lies in a horizontal plane and the accelerometer is locked in a position to sense the acceleration applied to the test specimen in a plane along which the sudden impulse is applied to the test specimen by the pneumatic hammer of the air gun 21 as will be more clearly apparent as the description proceeds.

Figure 3:
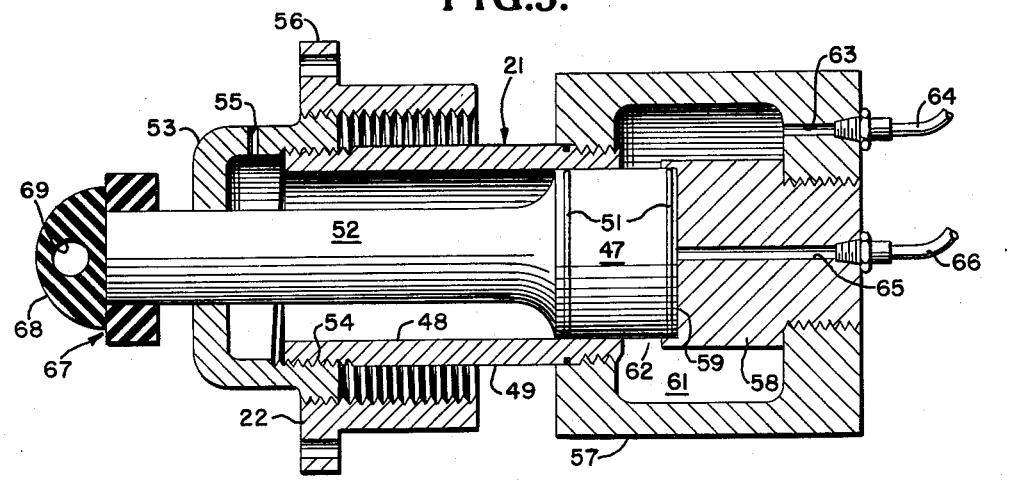
Fig. 3 is an enlarged view partially in section of an air gun suitable for use with the present invention and having a shock pad affixed thereto.
Figure 4:
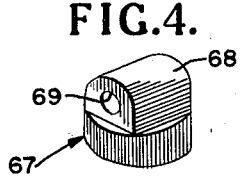
Fig. 4 is a view in perspective of a shock pad suitable for use with the air gun of Fig. 3.

An air gun such, for example, as the air gun illustrated on Fig. 3, may be advantageously employed with the present invention to impart a shock impulse of predetermined intensity and character to the test specimen during a testing operation. The air gun comprises a piston 47 slidable within a bore 48 of cylinder 49 and sealed thereto by a pair of O-rings 51 which are preferably lubricated to reduce friction therebetween. The piston 47 is formed integrally with a circular shank or hammer 52 slidable within a bearing member 53 threaded to the cylinder 49 as at 54 and provided with an air vent 55. The bearing member 53 has secured thereto in any suitable manner, as by threading the parts together, a mounting flange 56 for securing the air gun to the boss 23 of cylinder 14 in such manner that the hammer 52 is adapted to deliver a radial blow to the seismic test vehicle 32 when the test vehicle is centered within the cylinder 14. A breech block 57 is threaded to cylinder 49 as shown and provided with a piston seat 58 threaded therein. The piston seat is provided with a recess 59 to receive the end portion of piston 47 when the piston is in a fully retracted position. The breech block is configured cylindrically to provide an air chamber 61 normally sealed by piston 47 and having a port 62 normally closed by the piston in such manner that the port is opened as the end of piston 47 moves away from piston seat 58 thereby to establish a fluid connection between the end of piston 47 and chamber 61 and suddenly accelerate the movement of the piston by the force of the compressed air within chamber 61.

The breech block 57 is provided with a duct 63 in communication with a breech supply line 64 and a second duct 65 in fluid communication with a blow-off air line 66.

Secured to the forward end of hammer 52 is a shock pad generally indicated by the numeral 67 and composed preferably of 35 durometer rubber. The pad has a semi-cylindrical protuberance 68 for engaging the seismic test vehicle and applying a shock of a predetermined strength and character thereto. The shock pad 67 illustrated on Fig. 3 is provided with a cylindrical aperture 69 as required to provide a shock having a predetermined characteristic. The size of aperture 69 relative to the semi-cylindrical portion 68 of the shock pad may be varied at will to provide a predetermined character to the impulse delivered by the air gun 21 or, if desired, may be omitted.

Figure 5:
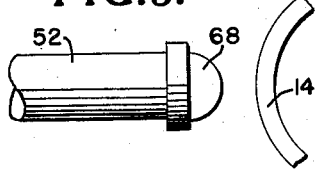
Fig. 5 is a schematic view of a shock pad suitable for use with the air gun.
Figure 11:
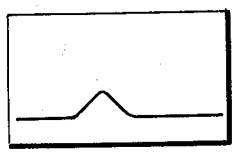
Figs. 11–16 are graphs illustrating the type of shock received from each of the shock pads of Figs. 5–10 respectively.
Figure 6:
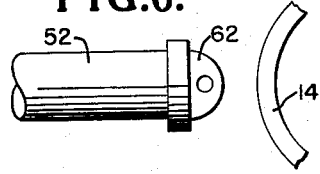
Fig. 6 is a view of an alternative form of shock pad.
Figure 12:
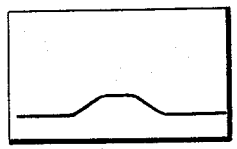
Figure 7:
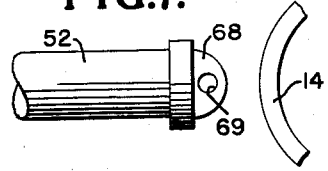
Fig. 7 is a view of still another form of shock pad.
Figure 13:
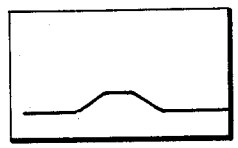
Figure 14:
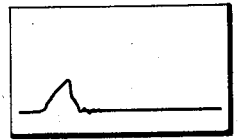

Referring now to Figs. 5 to 10 on which are shown various shock pad devices, the shock pads of Figs. 5–7 are comprised preferably of 35 durometer rubber, the pad of Fig. 5 having no aperture within the semi-cylindrical protuberance 68 thereof, and the pads of Figs. 6 and 7 having apertures of different sizes. The characteristic of the shock delivered by each of the shock pads of Figs. 5 to 7 are shown on Figs. 11–13 respectively, the shock shown on Fig. 11 being of greater intensity and shorter duration than the shock shown on Fig. 13 and the shock of Fig. 12 being of intermediate value both in regard to intensity and duration. The shock pad of Fig. 8 comprises a lead cone 71 secured to the end of the hammer 52 in any suitable manner as by a length of cellophane tape 72. As shown on Fig. 14 the shock wave provided by this device is asymmetrical.

Figure 8:
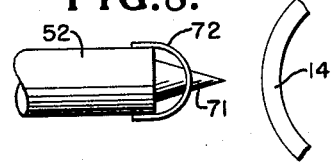
Fig. 8 is a diagrammatic view of a shock pad comprising a lead cone.
Figure 9:
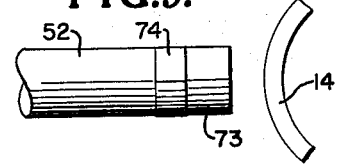
Fig. 9 is a diagrammatic view of a shock pad composed of polystyrene.
Figure 15:
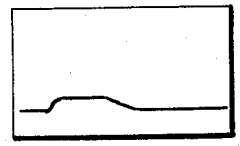
Figure 10:
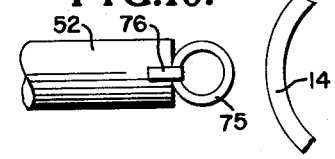
Fig. 10 is a view of a shock pad of cylindrical configuration composed of lead.
Figure 16:
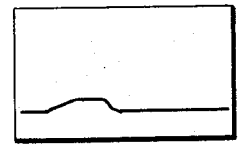

The shock pad device of Fig. 9 comprises a cylindrical pad 73 composed of polystyrene secured in abutting relation with the end of hammer 52 by a length of cellophane tape 74. When employed with the test device of Fig. 1 a shock of relatively low intensity and high duration is received as shown on Fig. 15. The shock pad of Fig. 10 comprises a hollow cylinder 75 composed of lead and secured to the end of hammer 52 as by a length of cellophane tape 76 in the manner illustrated. This shock pad produces a shock impulse as shown on Fig. 16. Each of the graphs shown on Figs. 11–16 was obtained by a recording oscillograph connected to the accelerometer 43 in any well known manner. Whereas the shock pads of Figs. 5–7 are reusable, it should be noted that the shock pads of Figs. 8 through 10 are expandable and must be replaced after each use thereof.

A control console, Fig. 1, indicated generally by the numeral 70 is employed with the device of the present invention and provided with any suitable source of compressed air such, for example, as an air compressor, or, if desired, air flasks in which the compressed air is stored. The supply line and blow-off line designated 64 and 66 respectively are connected to the control console and thence to the source of compressed air, a pair of valve members 77 and 78 being included in the air lines to control the supply of air thereto, the pressure of the air supplied to the lines 64 and 66 being indicated by the pressure gages 79 and 81 respectively. In like manner the electrical cable 44 is connected to the console as at 82 thereby to establish an operative connection to the oscillograph 83 which may be, if desired, of the recording type. A pair of controls 84 are provided for controlling the electrical signal received from the accelerometer 43 for suitable display by the oscillograph.

It will be noted, Fig. 1, that a stopping pad 85 composed of foam rubber or the like and preferably extending the full length of the cylinder or turret 14 is provided and secured to the interior of cylinder 14 diametrically opposite from the air gun whereby the seismic test vehicle strikes the pad 85 and is brought to rest after an impulse has been received from the air gun.

The air gun just described provides means for suddenly accelerating light test components at any desired angle while the components are mounted in their normal orientation with respect to the earth's gravitational field, it being merely necessary to rotate the cylinder 14 to the desired angle and clamp it in this position by the clamping members 16 and bolts 17 secured thereto. The seismically suspended carriage 32 is brought into axial coincidence with the cylinder 14 by adjustment of the turnbuckles 28. The chamber 61 is charged with air at a suitable pressure, such for example, as 100 lbs. per square inch. Air at a relatively low pressure of the order of 1 lb. or less per square inch is admitted to air line 66 causing movement of the piston away from piston seat 58.

When this occurs air within chamber 61 is suddenly applied to the end of piston 47 causing the air gun to strike the test vehicle a blow of predetermined strength and characteristic. The acceleration of the test specimen is sensed by accelerometer 43 and recorded or otherwise displayed by oscilloscope 83 when a test operation has been completed.

Valves 77 and 78 are turned to a position communicating air lines 64 and 66 with the outside air and the piston 47 is restored manually to the initial position shown on Fig. 3. The test apparatus disclosed herein includes means for applying acceleration of 2 to 50 g. and velocity from .025 to 15 f.p.s. by varying the air pressure within chamber 61. Shock durations of two to 50 milliseconds can be obtained by varying the material and shape of the hammer impacting the surface. By proper selection of the shock pad secured to the end of hammer 52 of the air gun, a half sine wave shock pulse of variable peak and duration is provided. Furthermore the shock is applied in a manner to accelerate a test component in any direction through an angle of 360°, if desired, while the test component is in its normal orientation with respect to gravity.

While the invention has been described with particularity with reference to one example which gives satisfactory results, it is not so limited as it will be apparent to those skilled in the art, after understanding the invention, that various changes and modifications may be made without departing from the spirit and scope of the invention and it is intended, therefore, in the appended claims to cover all such changes and modifications.

What is claimed as new and desired to be secured by Letters Patent of the United States is:

1. A shock tester for an inertial operated firing device comprising a mount having an aperture therein, a cylindrical carriage resiliently suspended within said aperture within which the device is carried, an accelerometer disposed within said carriage and settable to a predetermined angle from the vertical, an air gun mounted on said mount for movement about said carriage and settable to said angle, a detachable rubber striker on said air gun for imparting a blow of predetermined character to said carriage as the gun is fired, and means operatively connected to said firing device and accelerometer respectively for indicating the firing of the device and the acceleration imparted thereto by said striker as the air gun is fired.

2. A shock tester for a gravity sensitive inertia operated firing switch comprising a resiliently supported test vehicle, means for mounting said switch within the vehicle in a predetermined oriented position with respect to the gravitational field, an air gun having an impact striker thereon, adjustable means for mounting said gun in a position to apply a shock to said vehicle in a vertical plane at any selected angle with reference to the direction of said gravitational field, means within said vehicle and settable into alignment with the direction of said shock for sensing the acceleration imparted to the vehicle as the shock is received, means for firing said gun, means connected to said switch for indicating the closure thereof, and means connected to said acceleration sensing device for recording the acceleration of the vehicle as the shock is received.

3. A tester according to claim 2 including a resilient pad, and means for mounting said pad interiorly on said mount in spaced adjacency to said vehicle and on the opposite side thereof from said gun to retard and stop the movement of the vehicle away from the gun as the gun applies a shock impulse to said vehicle.

4. A tester according to claim 3 in which said gun comprises a breech chamber having a movable element and a quantity of compressed air therein, and means for suddenly applying the pressure of said air to said movable element in a manner to quickly accelerate said element as the element moves away from an initial position of rest.

5. A tester according to claim 4 in which said impact striker comprises a rubber shock pad.

6. A tester according to claim 4 in which said impact stroker comprises a conical member composed of lead aligned with the direction of movement of said element with the apex thereof in closest proximate spaced relation to said vehicle.

7. A tester according to claim 4 in which said impact striker is composed of polystyrene and of cylindrical configuration with the axis thereof coinciding with the axis of the movable element of said gun.

8. A tester according to claim 4 in which the impact striker comprises a hollow cylinder of lead secured to the striking end of the gun impact striker with the axis normal thereto.

9. A shock tester for a gravity sensitive inertia actuated switching device comprising a framework having a circular saddle formed therein, a hollow cylindrical member fitted within said saddle, means for clamping said member to the saddle in any angular set position with respect thereto, an air gun mounted on said cylindrical member and having a striker positioned radially therein, a hollow cylindrical test vehicle of less diameter than said cylindrical member and having a pair of supports secured in mutually aligned relation at opposite ends and near the outer periphery thereof, a pair of elongated elastic members respectively secured to said supports, means carried by said framework and secured to the opposite ends of said elastic members for supporting the test vehicle in such manner that the test vehicle is disposed within said cylinder member and concentric therewith, means for mounting said device within said vehicle in a predetermined oriented position with respect to the earth's gravitational field, and means including a pair of external electrical connections to said device for indicating the result of the sudden impulse applied thereto by said gun as the gun is fired.

10. A tester according to claim 9 including means within said vehicle for sensing the acceleration thereof as the impulse from the gun is received, and means operatively connected to said acceleration sensing means for recording the force of the acceleration of said vehicle.

References Cited in the file of this patent
UNITED STATES PATENTS
2,824,444    Hanes _____ Feb. 25, 1958